(12) United States Patent
 Walter (10) Patent No.: US 7,827,937 B1
(45) Date of Patent: Nov. 9, 2010

(54) MARINE LINE FORM HABITAT

(76) Inventor: David Walter, P.O. Box 998, Orange Beach, AL (US) 36561

( * ) Notice: Subject to any disclaimer, the term of this patent is extended or adjusted under 35 U.S.C. 154(b) by 501 days.

(21) Appl. No.: 11/928,709

(22) Filed: Oct. 30, 2007

(51) Int. Cl.
 *A01K 61/00* (2006.01)
 *E02B 3/04* (2006.01)
(52) U.S. Cl. .......................................... 119/221; 405/25
(58) Field of Classification Search ................. 119/221; 405/15, 21, 25, 17, 33, 35
 See application file for complete search history.

(56) References Cited

U.S. PATENT DOCUMENTS

| | | | |
|---|---|---|---|
| 1,169,985 A * | 2/1916 | Mickelson | 264/255 |
| 4,993,362 A * | 2/1991 | Jimbo | 119/221 |
| 5,071,285 A * | 12/1991 | Van Doren | 405/25 |
| 5,109,796 A * | 5/1992 | Monus | 119/221 |
| 5,215,406 A * | 6/1993 | Hudson | 405/25 |
| 5,803,660 A * | 9/1998 | Warren et al. | 405/25 |
| 5,836,265 A * | 11/1998 | Barber et al. | 119/221 |
| 6,293,065 B1 * | 9/2001 | Suzuki et al. | 52/315 |
| 6,443,654 B1 * | 9/2002 | Kauppi | 405/108 |
| 6,896,445 B1 * | 5/2005 | Engler | 405/25 |
| 7,144,196 B1 * | 12/2006 | Campbell et al. | 405/30 |
| 7,513,711 B1 * | 4/2009 | Walter | 405/25 |

FOREIGN PATENT DOCUMENTS

JP 60242227 A * 12/1985

* cited by examiner

*Primary Examiner*—Yvonne R. Abbott
(74) *Attorney, Agent, or Firm*—Michael I Kroll (57) ABSTRACT

Providing underwater marine structures having a primary component of sedimentary rock of biochemical origin that is fixated into an assemblage forming structure that is anchored into the marine environment to foster establishment of a reef ecosystem.

20 Claims, 14 Drawing Sheets

MARINE LINE FORM HABITAT

BACKGROUND OF THE INVENTION

1. Field of the Invention

The present invention relates generally to artificial reefs and, more specifically, to marine structures having a primary component of sedimentary rock of biochemical origin that is fixated into an assemblage forming structure that is anchored into the marine environment to foster establishment of a reef ecosystem.

The present invention is a continuation of a process, typified in my earlier U.S. Pat. No. 6,824,327, to develop artificial habitat conducive to reef dwelling marine life forms. The question of why the world's coral reef systems are dying whether a natural phenomena, pollution or global warming spells the same end for many marine species that depend on such ecosystems—the loss of habitat.

The present invention concerns itself with mooring artificial habitats that are conducive to receptive marine life forms, such as algae, worms, crustaceans, and small fish. Not only to stem the tide of loss but to enhance marine ecosystems wherever applicable.

A primary component of these artificial habitats is the use of biochemical rocks especially Limestone, a soft porous mostly calcite rock suitable for attachment to by marine life. Illustrated in the accompanying drawings is an example of an artificial structure comprising spaced apart stratified slabs anchored in a desired location as habitat for marine life. As aforementioned, the slabs, hereinafter referred to as bio-slabs are comprised primarily of rocks of biochemical origin joined to form a structure reintroduced into the marine environment as an inducement to colonization by receptive marine organisms there by initiating establishment of a seed culture with the intended creation of a self-sustaining reef ecosystem. The stratification of the reef foundation material in a spaced relationship increases the surface area within a given space and bestows an environment of variable dimensions when combined with water temperature, pressure and sunlight penetration at the various depths of bio-slab locations.

The present invention further provides for the formation of marine structures used for estuary enhancement, artificial reef, shoreline protection, erosion protection, dock enhancements to increase marine life, waterfront bulkhead replacement, oyster bed cultivation, juvenile fish habitat, coral reef replacement/substitution, fisheries restoration, and fish farming. The basic principal is to bind rocks within a cementitious material within a mold of varying shapes and dimensions so that when cured these aggregated rock structures have a long term life expectancy in a marine environment of both fresh and salt water that serve one or more of the aforementioned purposes. One type of rock having characteristics amenable to marine organisms is limestone owing to its formation from seashells and coral from ancestral seas. Since it is loosely consolidated, marine animals and crustaceans easily establish a culture which attracts fish and other marine organisms establishing a biosphere using the bio-slabs in an anchored or unanchored fashion as a single molded piece or in stacked fashion depending on the desired result.

The present invention further provides that the structures comprising anchor posts and positional slab-like platforms are very cost effective to transport and assemble at a desired site.

2. Description of the Prior Art

There are other structures designed for habitat by aquatic life forms. While these structures may be suitable for the purposes for which they were designed, they would not be as suitable for the purposes of the present invention, as hereinafter described.

SUMMARY OF THE PRESENT INVENTION

A primary object of the present invention is to provide artificial habitat structures for marine life.

Another object of the present invention is to provide artificial habitat structures comprising at least one bio-slab anchored in a desired location.

Yet another object of the present invention is to provide artificial habitat structures having a plurality of spaced apart bio-slabs anchored in a desired location.

Still yet another object of the present invention is to provide artificial habitat structures having spacers between the bio-slabs to fix their relative position from one to the other.

Another object of the present invention is to provide artificial habitat structures wherein the spacing between the bio-slabs can be varied to accommodate variously sized marine life forms.

Yet another object of the present invention is to provide bio-slabs comprising sedimentary rocks of biochemical origin cementitiously bonded into shapes of varying thicknesses, surface area and contour.

Still yet another object of the present invention is to provide bio-slabs that may have a throughbore for mounting on a post.

An additional object of the present invention is to provide artificial marine habitat structures that are cost effective to manufacture.

A further object of the present invention is to provide artificial marine habitat structures that are easily shipped in their component parts and easily assembled onsite.

Additional objects of the present invention will appear as the description proceeds.

The present invention overcomes the shortcomings of the prior art by providing underwater marine structures having a primary component of sedimentary rock of biochemical origin that is fixated into an assemblage forming structure that is anchored into the marine environment to foster establishment of a reef ecosystem.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Marine Life Form Habitat of the present invention. With regard to the reference numerals used, the following numbering is used throughout the various drawing figures.

- 10 Marine Life Form Habitat of the present invention
- 12 marine life
- 14 bio-slabs
- 16 rocks
- 18 bonding agent
- 20 water
- 22 limestone
- 24 cementitious material
- 26 mounting aperture
- 28 anchor post
- 30 coquina (south florida limestone)
- 32 outer surface of 28
- 34 top potion of 28
- 35 bottom portion of 28
- 36 rigid member of 28
- 38 eyelet of 36
- 40 square bio-slab
- 42 round bio-slab
- 44 rectangular bio-slab
- 46 fish
- 48 boring animals
- 50 crustaceans
- 52 coral
- 54 bio-slab mold
- 56 base of 54
- 58 stanchion of 54
- 60 form of 54
- 62 mold post of 54
- 64 feet of 28
- 66 spacer
- 68 platform of 66
- 70 separation shaft of 66
- 72 platform bottom
- 74 shaft bottom
- 76 top portion of 14
- 78 central throughbore of 66
- 80 shoreline
- 82 eco-reef
- 84 waves
- 86 piling
- 88 anchor portion of 86
- 90 anchor post of 86
- 92 stop of 80
- 94 hole for piling
- 96 support of 86

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

Figure 1:
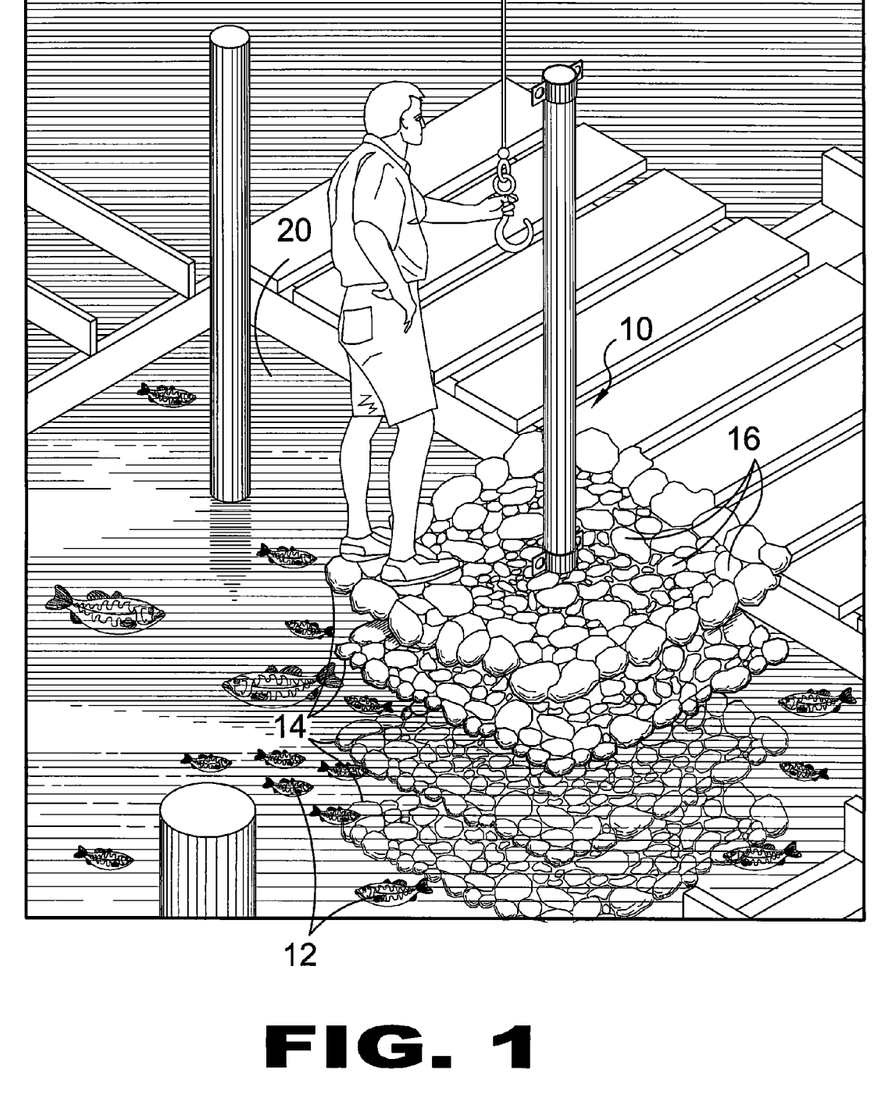
FIG. 1 is an illustrative view of a variation of an artificial reef of the present invention.

FIG. 1 is an illustrative view of a variation of an artificial reef of the present invention 10. Illustrated is a version of a marine structure comprising spaced apart stratified bio-slabs 14 anchored in a desired location as habitat for marine life 12. The bio-slabs 14 comprise rocks 16 which can be of biochemical origin joined to form a structure reintroduced into the marine environment as an inducement to colonization by receptive marine organisms 12 there by initiating establishment of a seed culture with the intended creation of a self-sustaining reef biosphere. The stratification of the reef foundation material in a spaced relationship increases the surface area within a given space and bestows an environment of variable dimensions when combined with water 20 temperature, pressure and sunlight penetration at the various depths of the bio-slab 14 locations.

Figure 2:
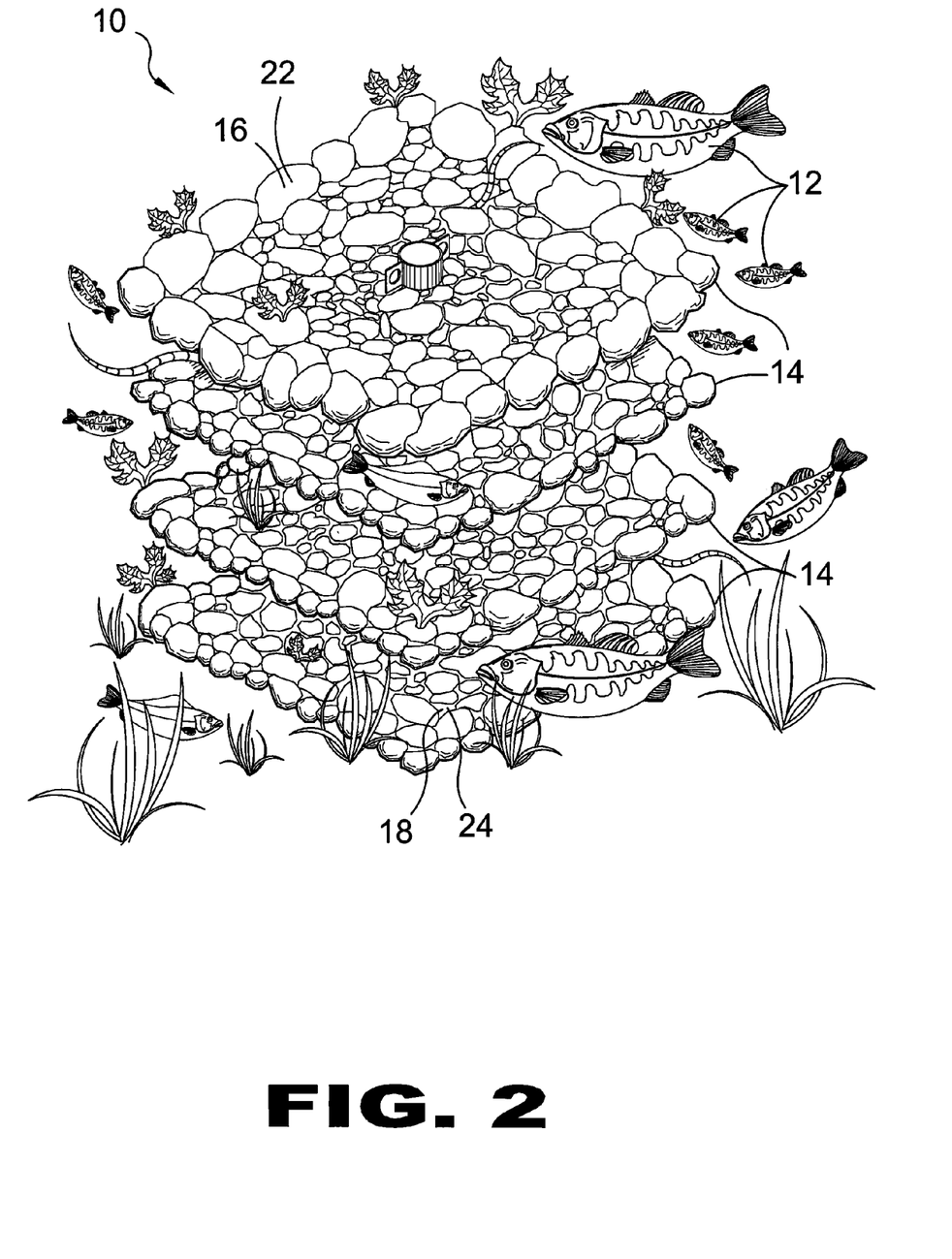
FIG. 2 is an illustrative view of the marine habitat structure of the present invention in use.

FIG. 2 is an illustrative view of the marine habitat structure of the present invention 10 in use. The present invention 10 provides various configurations of marine structures serving as estuary enhancement, artificial reef, shoreline protection, erosion protection, dock enhancements to increase marine life, waterfront bulkhead replacement, oyster bed cultivation, juvenile fish habitat, coral reef replacement/substitution, fisheries restoration, and fish farming. Depicted is one example of the aforementioned comprising a marine structure 10 forming a marine biosphere comprised of a plurality of spaced apart layered bio-slabs 14 with spacers therebetween providing habitat for marine life 12 with each bio-slab 14 comprising rocks 16, preferably limestone 22, bound together by a bonding agent 18 such as a cementitious material 24. Varying the spacing between the bio-slabs 14 can provide stratified habitats within the same anchored marine structure.

Figure 3:
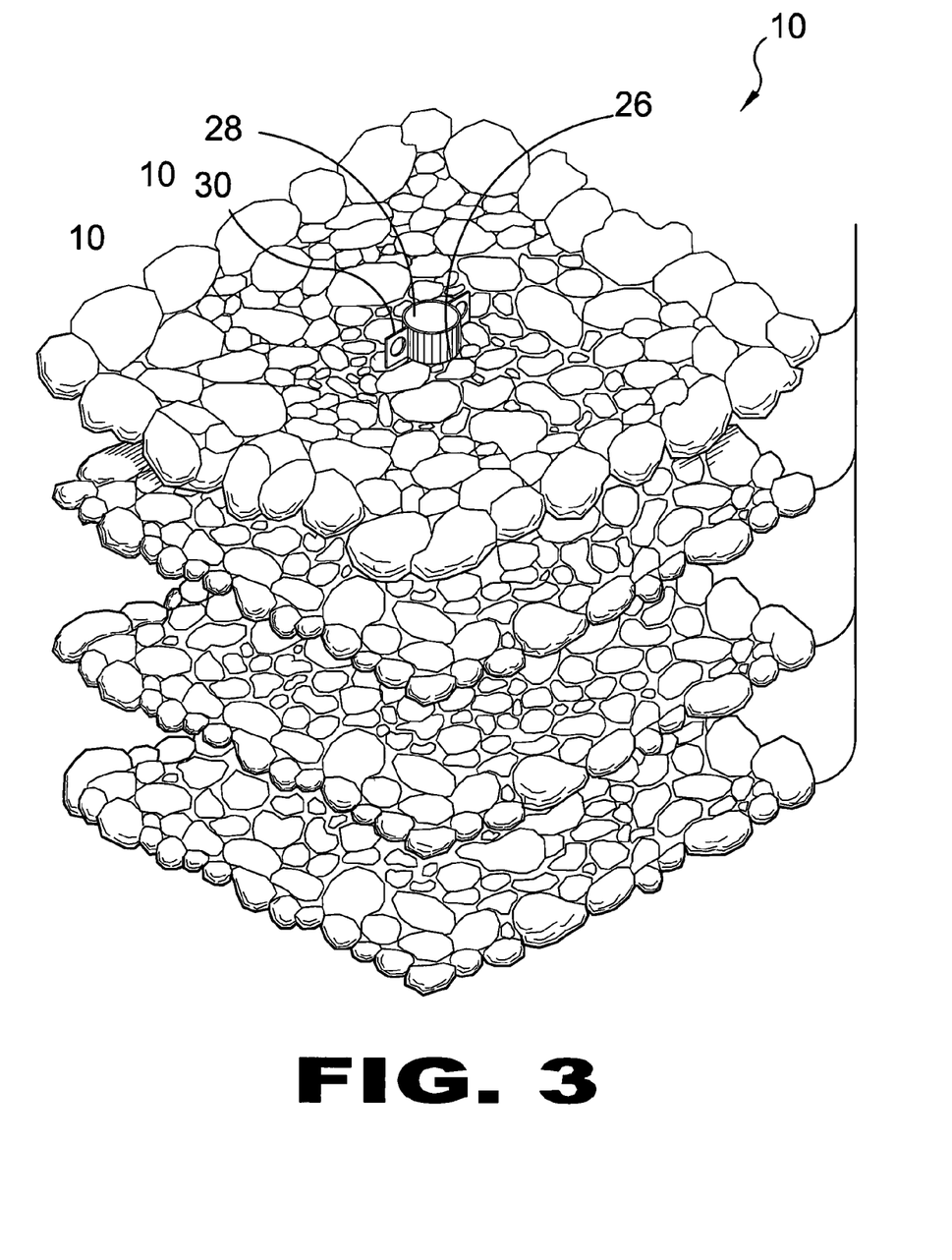
FIG. 3 is a perspective view of a marine structure of the present invention.
Figure 4:
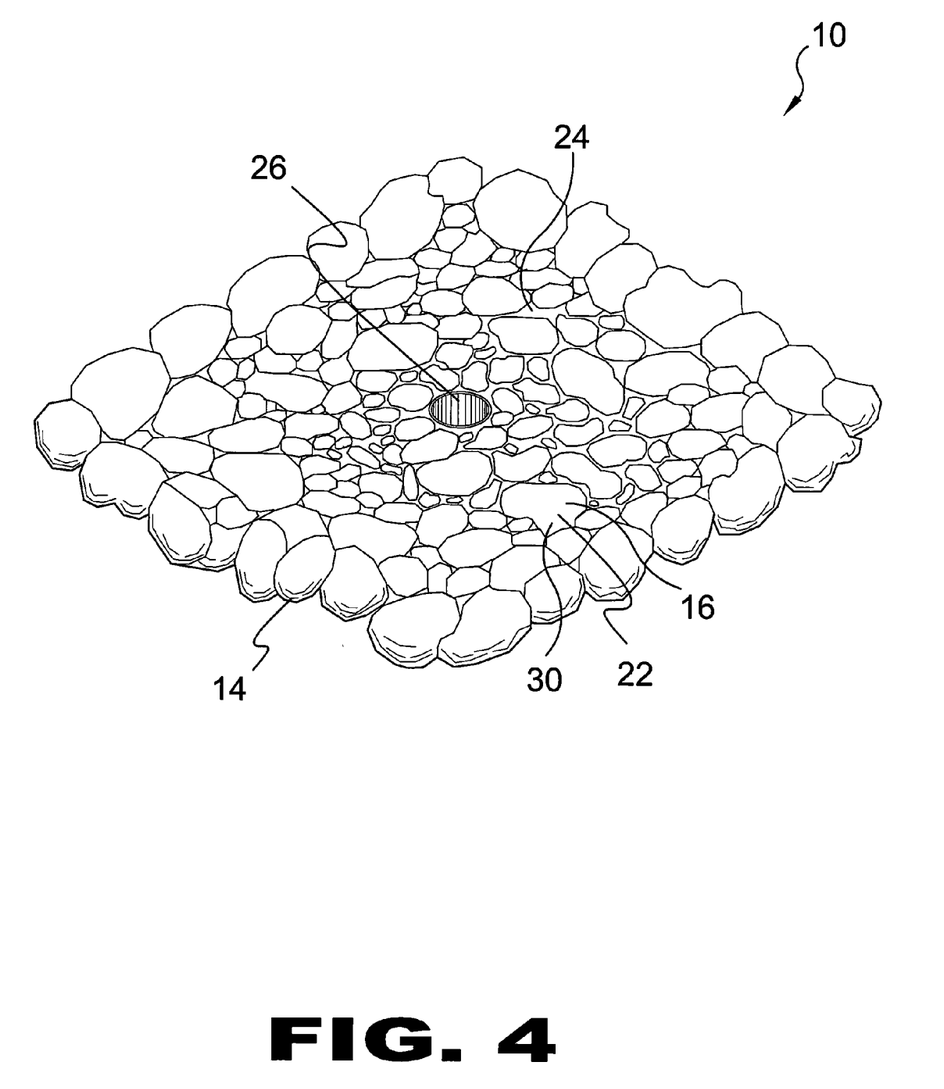
FIG. 4 is an illustrative view of a variation of a marine structure using biochemical rocks in a cementitious material.

FIG. 3 is a perspective view of a marine structure of the present invention 10 serving to enhance aquatic organisms' habitat. The stratified shape of the design allows marine life to access inner areas of the structure by using small stones 16 instead of one large stone resulting in greater surface area exposed for the marine life to attach to the structure. In a variation using limestone 22 provides for marine animals and other marine life forms such as crustaceans to attach, attracting fish and other marine life to the artificial marine structure. Each bio-slab 12 has a centrally mounting aperture FIG. 4 is an illustrative view of a variation of a marine structure using biochemical rocks 16 in a cementitious material 24. The present invention 10 provides for the formation of structures used for estuary enhancement, artificial reef, shoreline protection, erosion protection, dock enhancements to increase marine life, waterfront bulkhead replacement, oyster bed cultivation, juvenile fish habitat, coral reef replacement/substitution, fisheries restoration, and fish farming. The basic principal is to bind rocks 16 within a cementitious material 24 within a mold of varying shapes and dimensions so that when cured these aggregated rock structures have a long term life expectancy in a marine environment of both fresh and salt water that serve one or more of the aforementioned purposes. One type of rock 16 having characteristics amenable to marine organisms is limestone 22 owing to its formation from seashells and coral from ancestral seas. A preferred type of limestone 22 is coquina 30, considered south Florida limestone since it is loosely consolidated and also has a high calcite concentrate, marine animals and crustaceans easily establish a culture which attracts fish and other marine organisms establishing a biosphere using the bio-slabs 14 in an anchored or unanchored fashion as a single molded piece or in stacked fashion depending on the desired result. A mounting aperture 26 is provided to allow for the passage over the outer surface of an anchor post.

Figure 5:
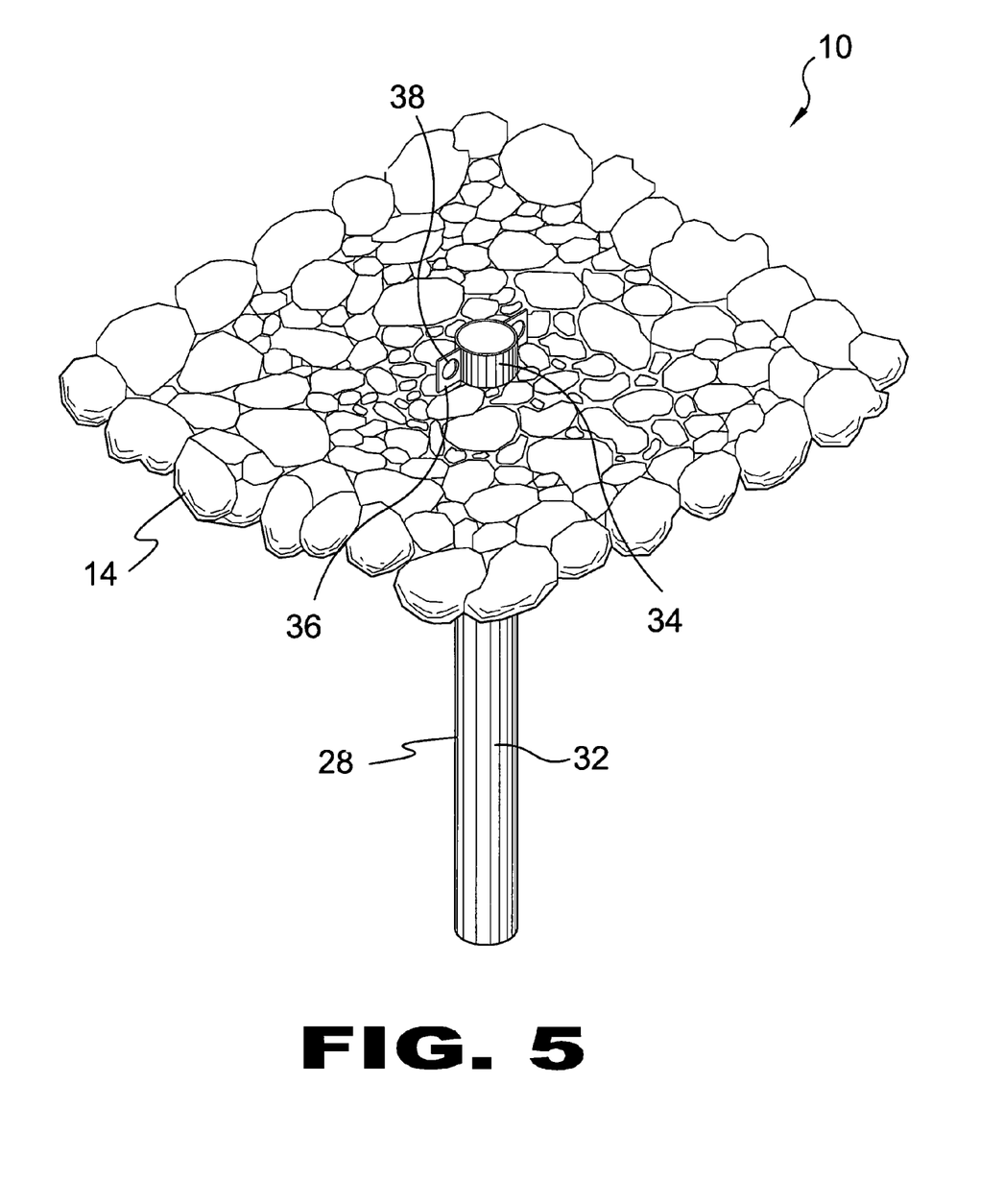
FIG. 5 is an illustrated view of an anchoring mechanism for a cast marine structure of the present invention.

FIG. 5 is an illustrated view of an anchoring mechanism for a cast marine structure of the present invention 10. Illustrated is a bio-slab 14 having an aperture 26 that accepts an anchored post 28 and encompasses the outer surface 32 thereof. The anchor post 28 has a top portion 34 with a rigid member 36 projecting therefrom with an eyelet 38 for receiving an eyehook or other such grasping device for lifting, transporting and lowering the marine structure in a desired location. The present invention 10 also provides that such structures are ideally suited for placement on pilings used in wharves and piers which not only serve as habitat for small fish but may also serve as anti erosion devices.

Figure 6:
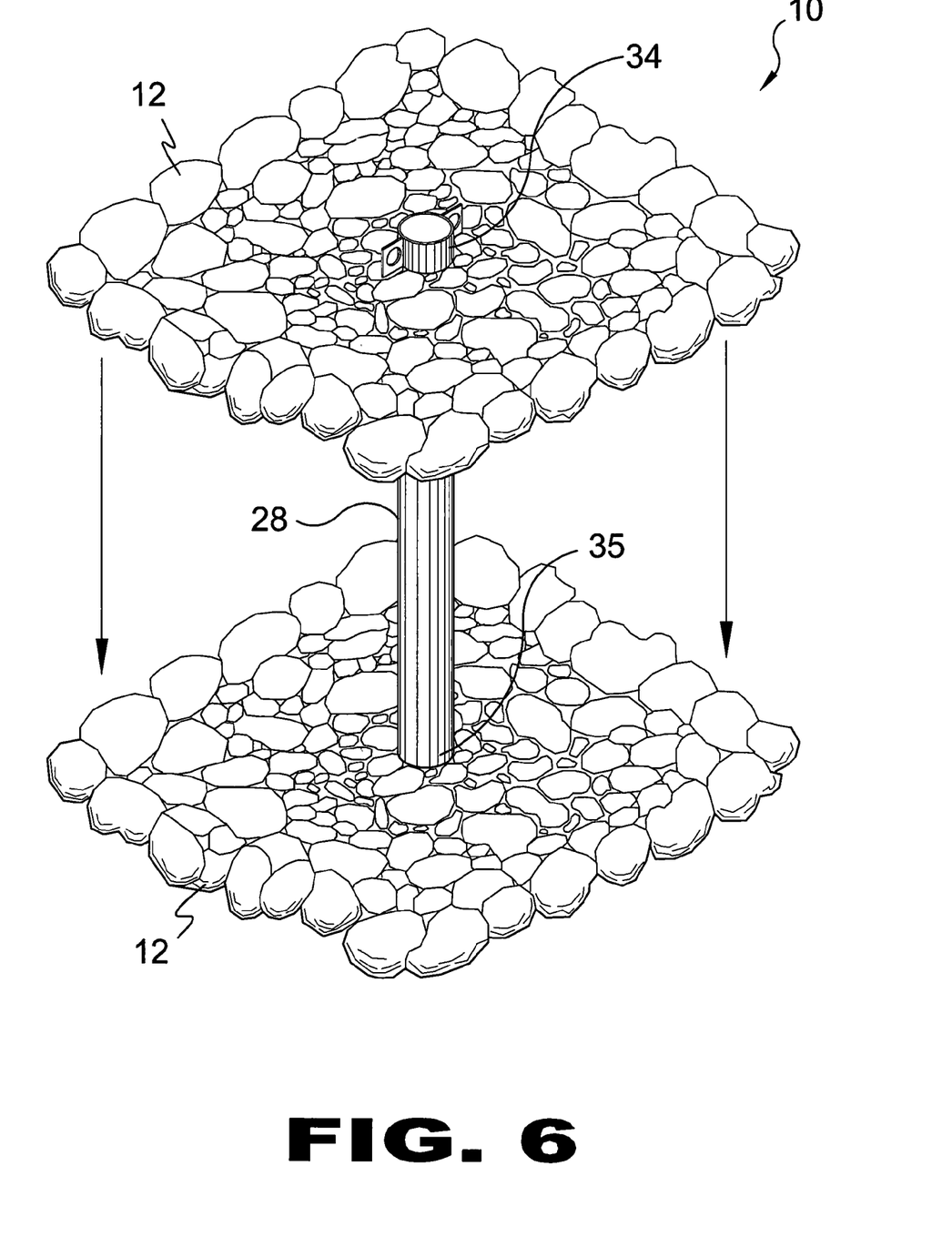
FIG. 6 is an illustrated view of an anchoring mechanism for stratified cast marine structures of the present invention.

FIG. 6 is an illustrated view of an anchoring mechanism for stratified cast marine structures of the present invention 10. Illustrated is a first bio-slab 14 disposed on the bottom portion 35 of the anchor post 28 and a second bio-slab 14 disposed at the top portion 34.

Figure 7:
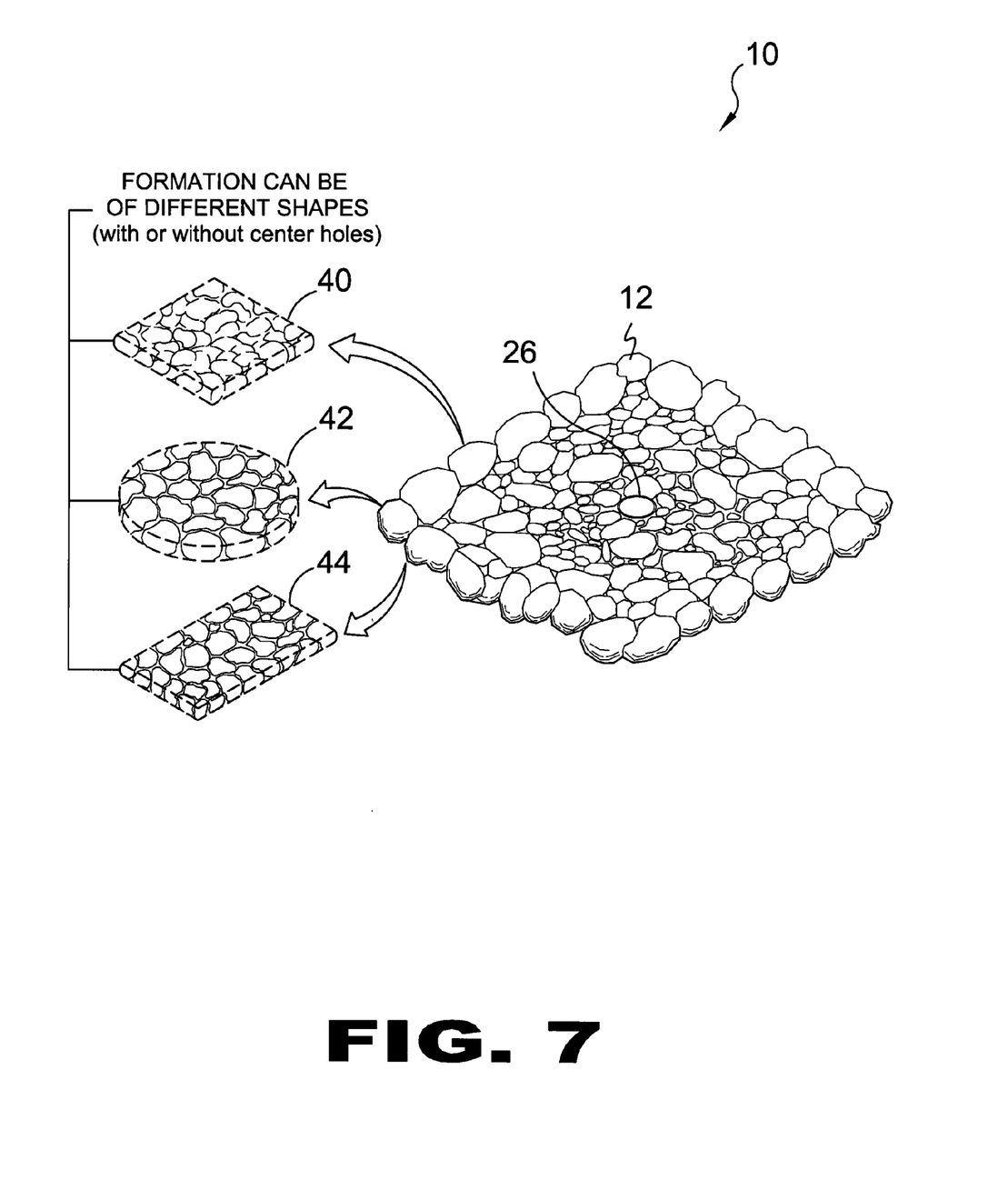
FIG. 7 is a perspective view of the marine structures of the present invention.

FIG. 7 is a perspective view of the marine structures of the present invention 10. Bio-slab 14 configurations can vary in shape and form and can be fabricated with mounting apertures 26 or without. Shown are a square bio-slab 40, a round bio-slab 42 and a rectangular bio-slab 44

Figure 8:
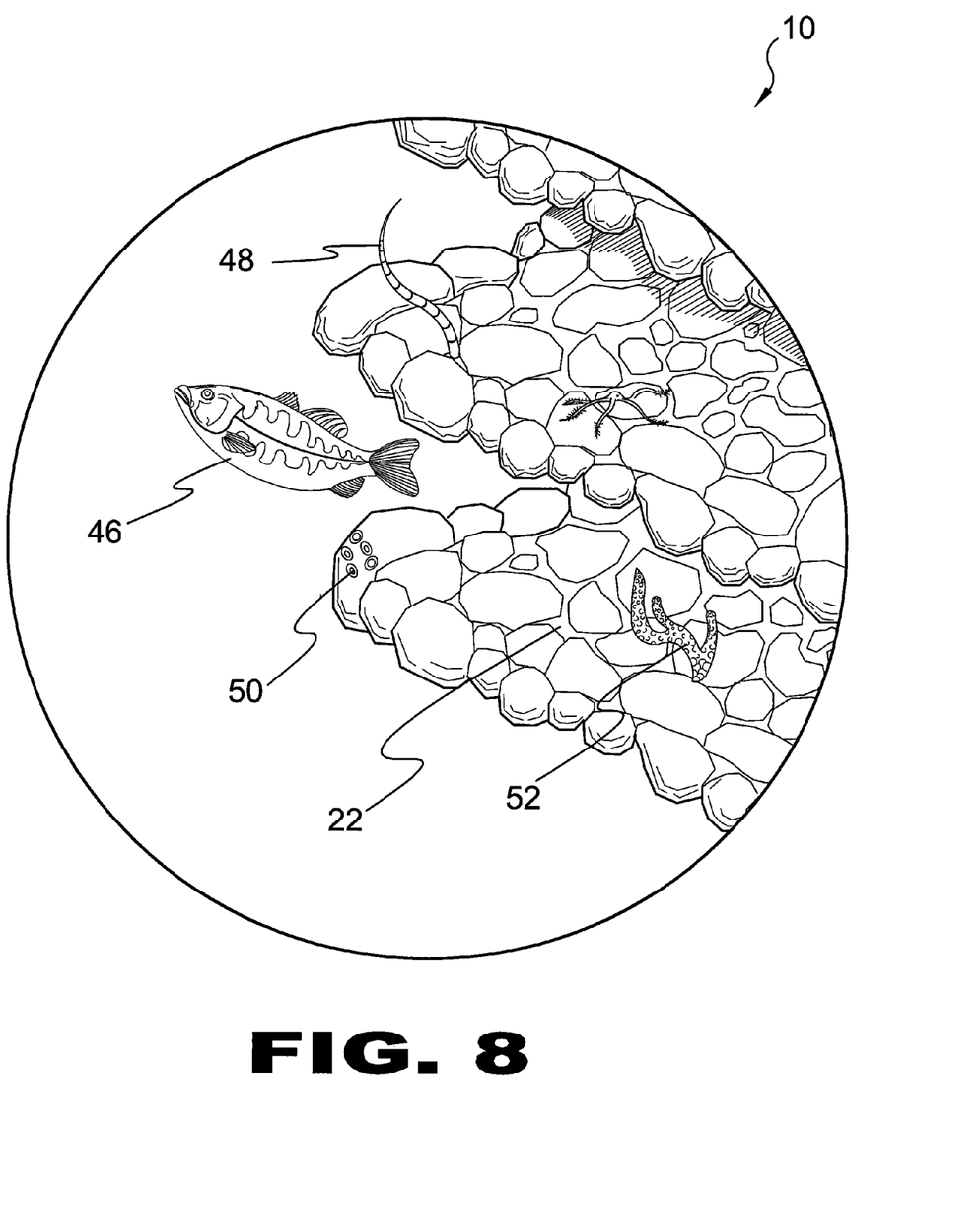
FIG. 8 is an enlarged view of a marine structure of the present invention.

FIG. 8 is an enlarged view of a marine structure of the present invention 10. Shown is the reef material and structure of the artificial reef of the present invention 10. The porous nature of the limestone 22 allows marine life forms such as crustaceans 50 to attach thereto, attracting fish 46, boring animals 48 and coral 52 and other marine life to the artificial reef.

Figure 9:
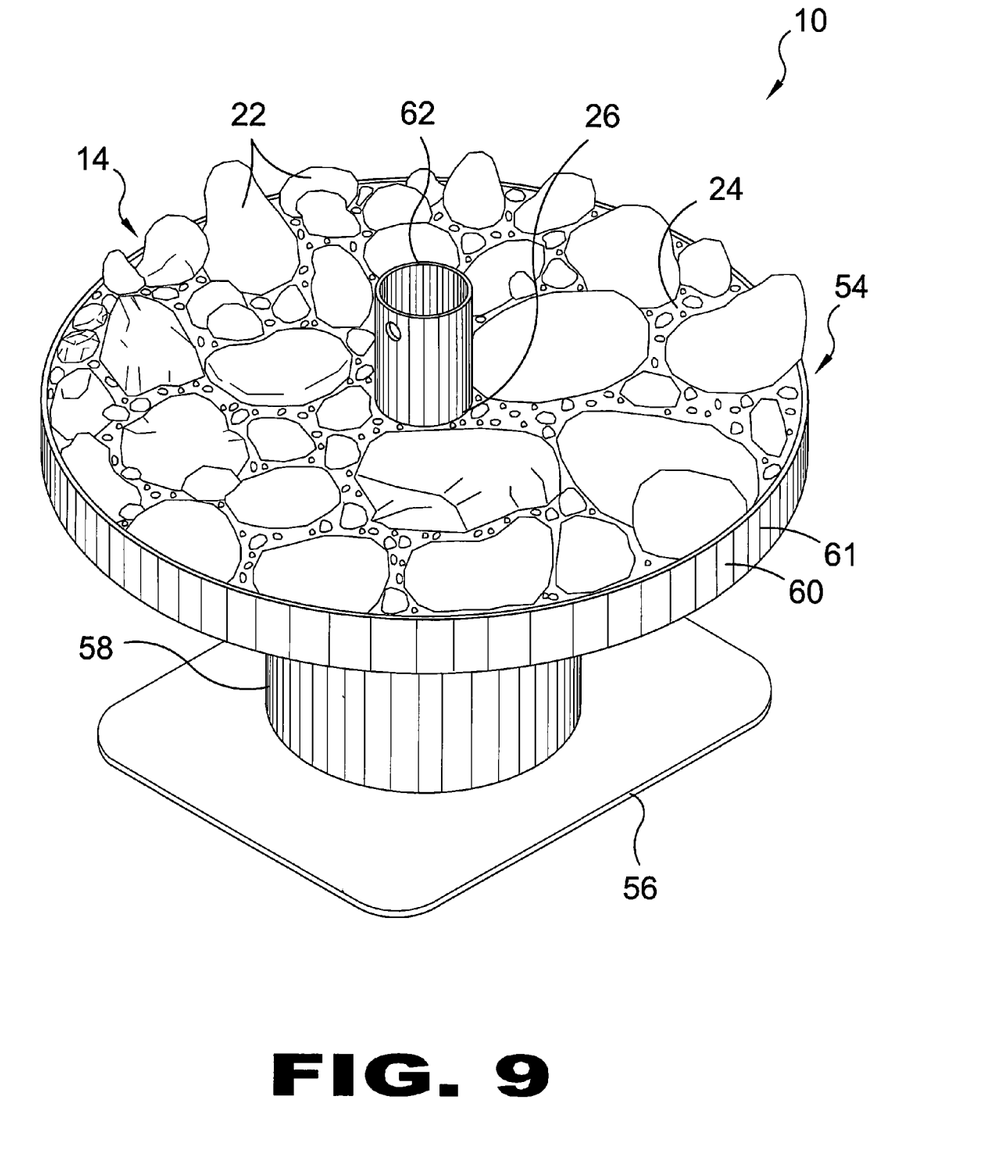
FIG. 9 is an illustrative view of a mold of the present invention.

FIG. 9 is an illustrative view of a mold 54 of the present invention 10. Shown is a typical mold 54 which can be of variable shape and dimensions used to create the bio-slabs 14. The mold 54 comprises a base 56, a stanchion 58 and a form 60 with upwardly depending sidewalls 61 in which the limestone 22 and cementitious material 24 is placed to cure. An aperture mold post 62 projects from the center of the form 60 to provide a mounting aperture 26 when one is desired. This reef will have three purposes;

1. Artificial reef for marine life habitat.

2. Shoreline erosion protection and artificial reef estuary.

3. Installed under piers to increase estuary capacity, can use any rock, and can be installed on a pipe or piling that's driven into the bottom. The pipe or piling can have a stop to prevent the unit from sliding down or not. The pipe or piling could be short enough to only hold the reef together and the unit rests on the bottom without the pipe or piling penetrating the bottom.

4. Replaces waterfront bulkheads.

5. Oyster beds.

6. Juvenile fish habitat.

7. Coral reef substitute.

8. Fisheries restoration.

9. Fish farming.

Figure 10:
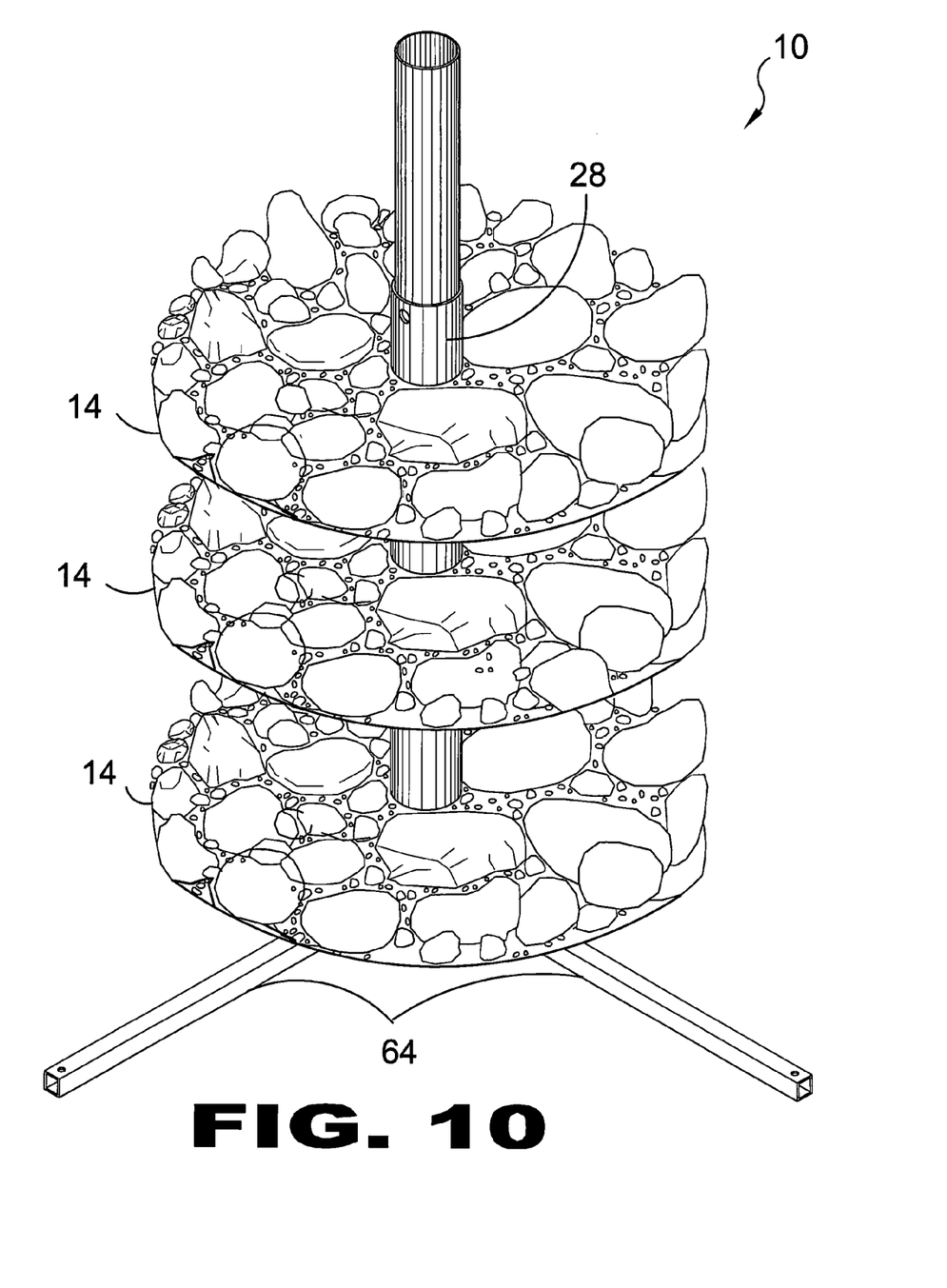
FIG. 10 is an illustrative view of the present invention.

FIG. 10 is an illustrative view of the present invention 10. Shown is a plurality of bio-slabs 14 installed on the anchor post 28 having a plurality of perpendicularly projecting feet 64 for the base. This reef will have three purposes;

1. Artificial reef for marine life habitat.

2. Shoreline erosion protection and artificial reef estuary.

3. Installed under piers to increase estuary capacity, can use any rock, and can be installed on a pipe or piling that's driven into the bottom. The pipe or piling can have a stop to prevent the unit from sliding down or not. The pipe or piling could be short enough to only hold the reef together and the unit rests on the bottom without the pipe or piling penetrating the bottom.

Figure 11:
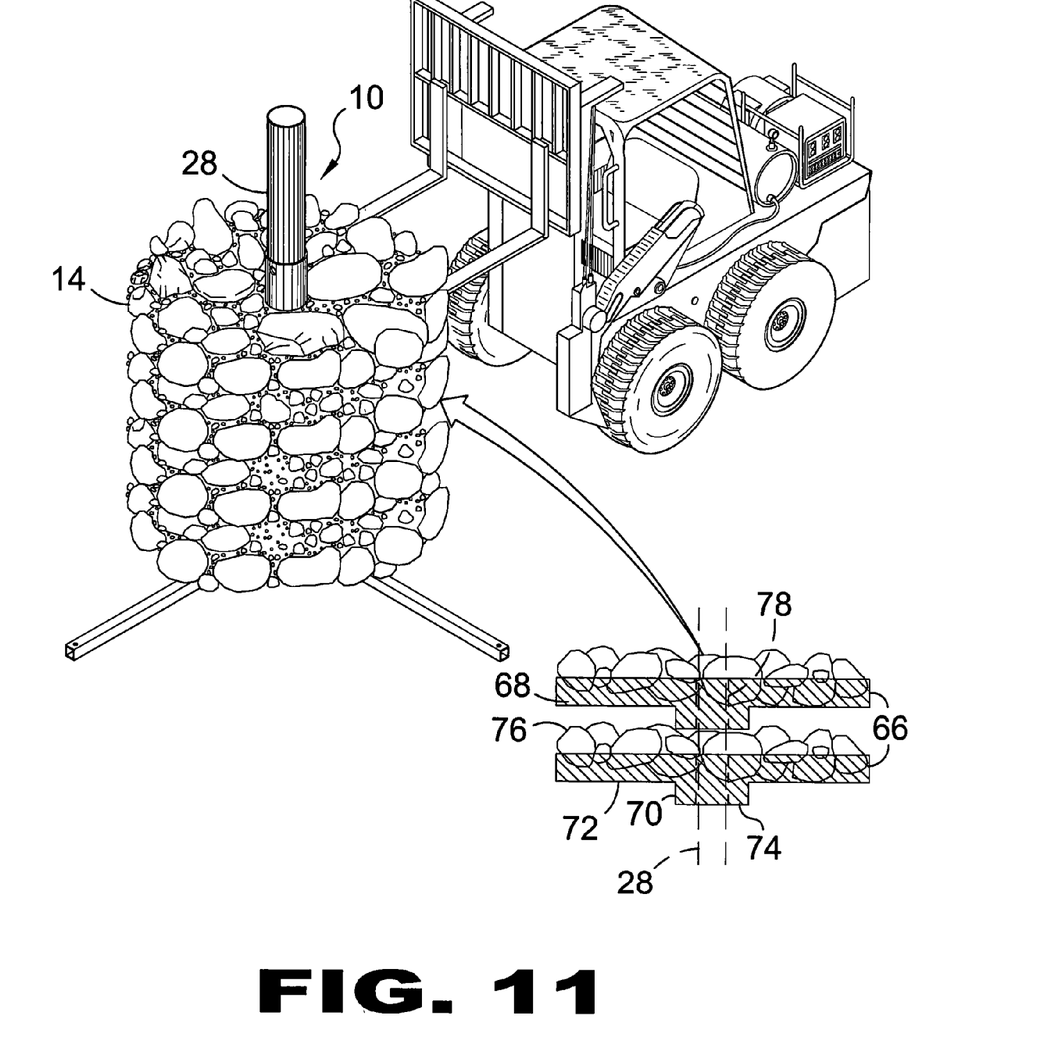
FIG. 11 is an illustrative view of the present invention.

FIG. 11 is an illustrative view of the present invention 10. Shown is the spacer 66 used to provide separation of the bio-slabs 14 when used in a stacked formation. The spacer comprises a platform 68 for supporting the bio-slab 14, a separation shaft 70 projecting downward from the platform bottom 72 and a central throughbore 78 extending from the shaft bottom 74 through the platform bottom 72 for allowing the passage of the anchor post 28 therethrough. The shaft bottom 74 sits on the top surface 76 of the subjacent bio-slab 14.

Figure 12:
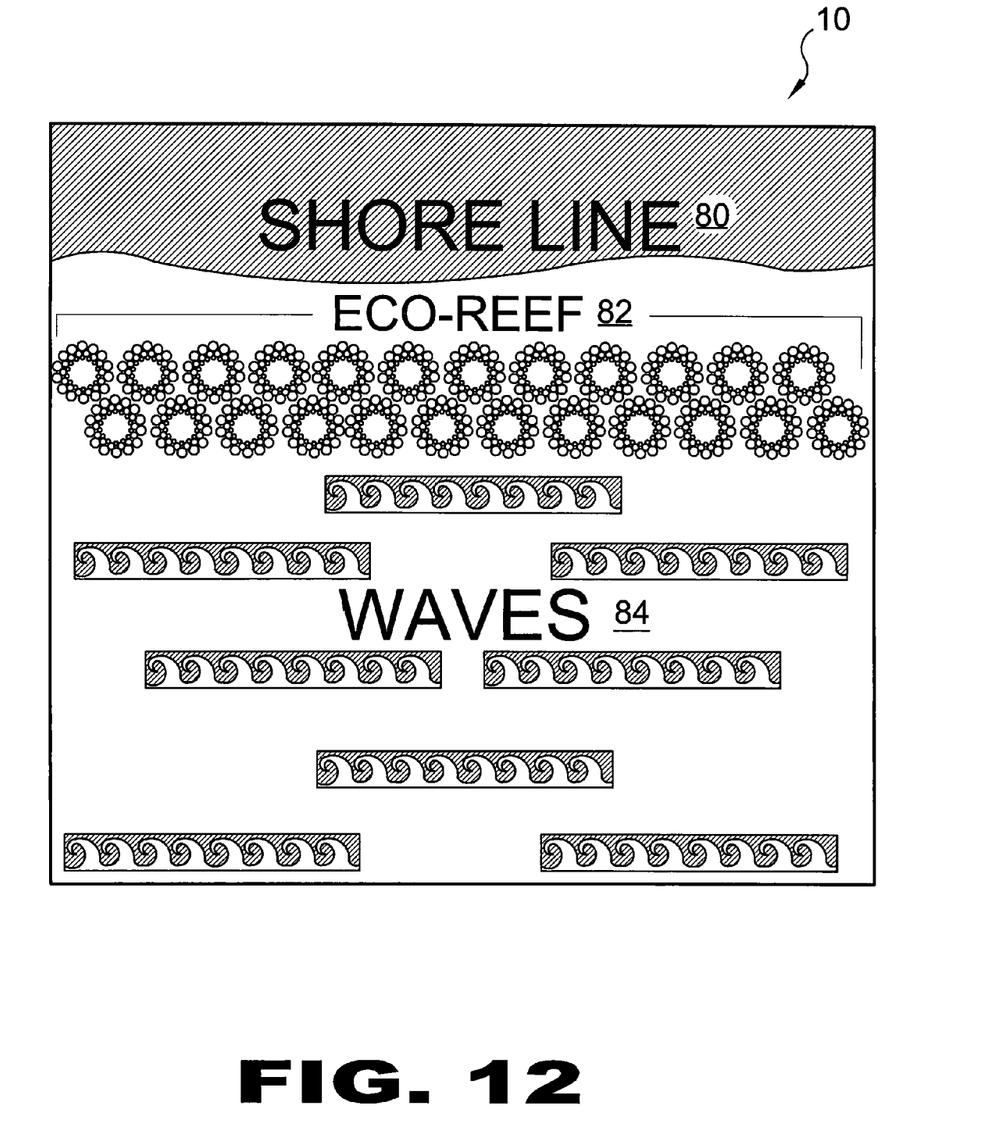
FIG. 12 is an illustrative view of the present invention.

FIG. 12 is an illustrative view of the present invention. Shown is the relationship of the eco-reef 82 in rows offshore to protect shoreline 80 from wave 84 erosion.

Figure 13:
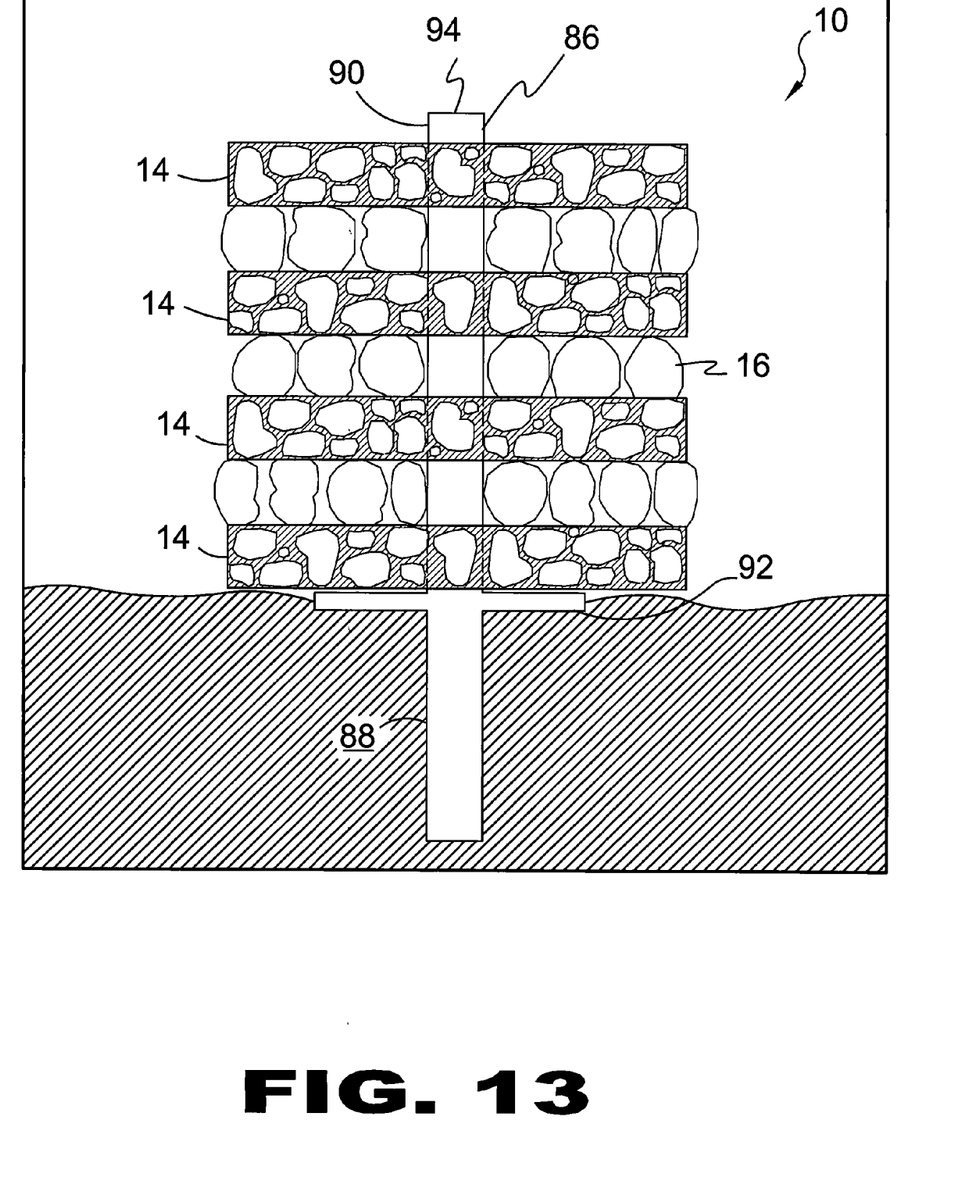
FIG. 13 is an illustrative view of the present invention.

FIG. 13 is an illustrative view of the present invention 10 in use as a shore protection reef and marine habitat disposed on a piling 86. Limestone or coquina rocks 16 are used to separate the bio-grids 14 instead of spacers to restrict the water flow therethrough. The anchor portion 88 of the piling 86 is embedded in the seabed and transitions to the anchor post portion 90 of the piling 86. A stop member 92 is disposed at the transition point and is seated on the seabed and a recess 94 is provided at the top portion of said piling 86.

Figure 14:
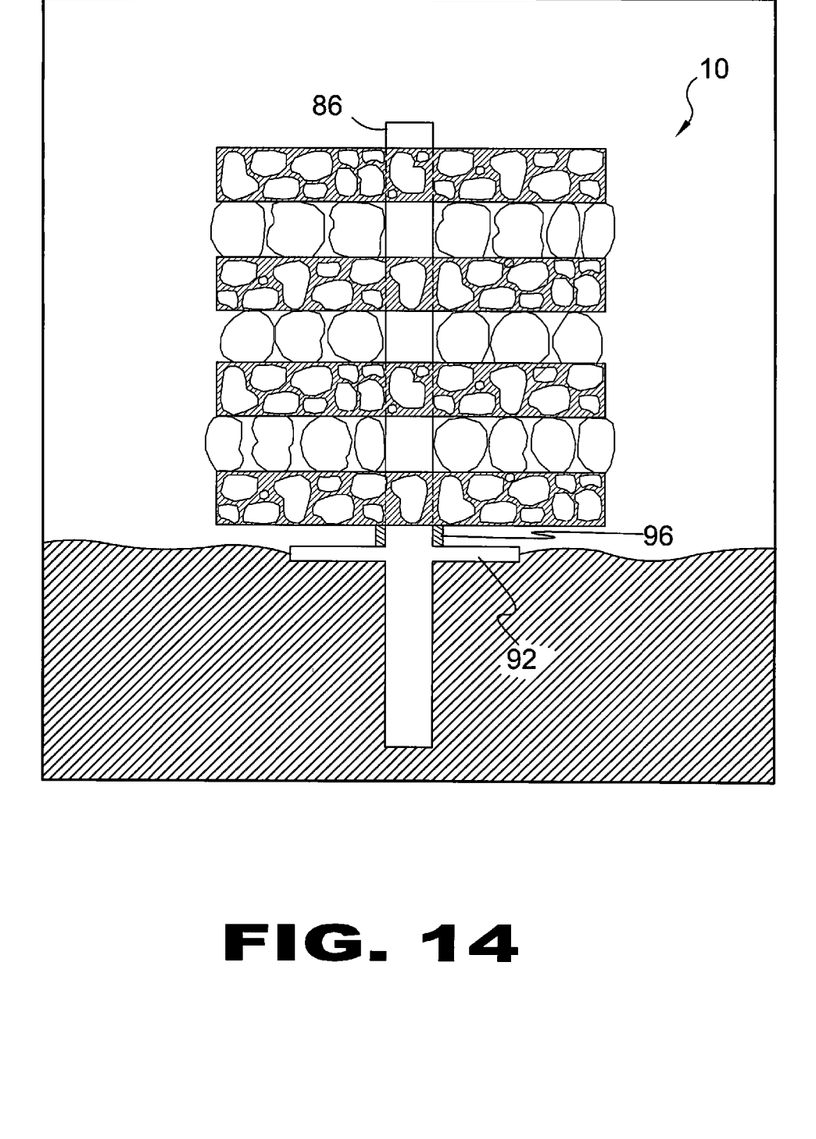
FIG. 14 is an illustrative view of the present invention.

FIG. 14 is an illustrative view of the present invention 10. Piling 86 will prevent the reef from moving or turning over and the stop 92 and support 96 will prevent settling.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An artificial reef system to provide a marine habitat ecosystem to promote marine life and provide erosion control against tides and currents, said artificial reef comprising:
   a) a plurality of bio-slabs comprising:
      i) a plurality of stones having substantially porous characteristics; and
      ii) a bonding agent for adhering said stones together into a single uniform slab;
   b) means for uniformly forming and curing said slabs therein; and
   c) means for stacking said slabs in a secure spaced apart manner to form an individual structure;
   d) said stone is coquina which is comprised of crushed shells, microorganisms and exoskeletons compressed by the water pressure applied to the seabed over time thereby providing a porous biologically and environmentally related stone-like material conducive to the attraction and habitation of marine life; and
   e) said bio-slab includes a centrally disposed mounting throughbore for receiving a substantially cylindrical elongate anchor post therethrough.

2. The artificial reef system recited in claim 1, wherein said stones have a substantial calcitic content.

3. The artificial reef system recited in claim 1, wherein said stone is limestone.

4. The artificial reef system recited in claim 1, wherein said bio-slab is installed by inserting said anchor post through said mounting throughbore and positioning accordingly.

5. The artificial reef system recited in claim 4, wherein a plurality of bio-slabs is disposed on said anchor post.

6. The artificial reef system recited in claim 5, wherein said anchor post is an elongate cylindrical post having a top portion, a bottom portion and an outer surface for receiving said bio-slabs therearound and can be transported and assembled on-site.

7. The artificial reef system recited in claim 6, wherein said anchor post further includes a rigid member projecting from a top portion thereof with an eyelet for receiving a grasping member of a boom or crane for lifting, positioning and lowering the assembled artificial reef into the desired location.

8. The artificial reef system recited in claim 7, wherein said anchor post further includes a plurality of perpendicularly depending feet extending from the bottom portion thereof.

9. The artificial reef system recited in claim 5, wherein said anchor post is integral with a piling comprising:
   a) a lower anchor portion embedded in the seabed;
   b) a mounting post transitioning continuously from said anchor portion and defined by the portion of said piling above the seabed; and
   c) a circumferential plate emanating perpendicularly from the transitional point of said piling with the bottom portion thereof seated on said seabed.

10. The artificial reef system recited in claim 9, wherein said piling further includes a support member on the bottom portion thereof to prevent settling.

11. The artificial reef system recited in claim 1, wherein said means for stacking said bio-slabs in a spaced apart fashion is a plurality of spacer elements.

12. The artificial reef system recited in claim 11, wherein each said spacer element comprises:
   a) a platform in a substantially parallel, planar relation with said bio-slabs and having a circumference exceeding that of said mounting throughbore thereof;
   b) a separation shaft projecting centrally from the bottom portion of said platform; and
   c) a central throughbore extending through said shaft and said platform of said spacer dimensioned to accommodate the passage of said anchor post thereto and align with said mounting aperture.

13. The artificial reef system recited in claim 12, wherein said spacer element is installed by inserting said anchor post into said central throughbore and sliding it until contact with a bio-slab.

14. The artificial reef system recited in claim 13, wherein said spacer elements and said bio-slabs are alternately installed on said anchor post with the bottom portion of said shaft residing upon the upper surface of the subjacent bio-slab and said platform supports the superjacent bio-slab thereby effectively separating the stacked slabs and exposing the surface area on both the top and bottom surfaces thereof.

15. The artificial reef system recited in claim 1, wherein said bonding agent is a cementitious material.

16. The artificial reef system recited in claim 1, wherein said means for forming said bio-slab is a mold comprising:
   a) a base stand;
   b) a stanchion projecting upward from said base stand; and
   c) a form disposed at the top of said stanchion with an upwardly depending sidewall for retaining the coquina and a cementitious mix therein.

17. The artificial reef system recited in claim 1 wherein a plurality of said artificial reef structures are disposed in patterns near the shoreline to disrupt and minimize the erosive effects of waves battering the shoreline.

18. An artificial reef system to provide a marine habitat ecosystem to promote marine life and provide erosion control against tides and currents, said artificial reef comprising:
   a) a plurality of bio-slabs comprising:
      i) a plurality of stones having substantially porous characteristics; and
      ii) a bonding agent for adhering said stones together into a single uniform slab;
   b) means for uniformly forming and curing said slabs therein; and
   c) means for stacking said slabs in a secure spaced apart manner to form an individual structure;
   d) said means for stacking said bio-slabs in a spaced apart fashion is a plurality of spacer elements;
   e) each said spacer element comprising:
      a) a platform in a substantially parallel, planar relation with said bio-slabs and having a circumference exceeding that of said mounting throughbore thereof;
      b) a separation shaft projecting centrally from the bottom portion of said platform; and
      c) a central throughbore extending through said shaft and said platform of said spacer dimensioned to accommodate the passage of said anchor post thereto and align with said mounting aperture.

19. The artificial reef system recited in claim 18, wherein said spacer element is installed by inserting said anchor post into said central throughbore and sliding it until contact with a bio-slab.

20. The artificial reef system recited in claim 19, wherein said spacer elements and said bio-slabs are alternately installed on said anchor post with the bottom portion of said shaft residing upon the upper surface of the subjacent bio-slab and said platform supports the superjacent bio-slab thereby effectively separating the stacked slabs and exposing the surface area on both the top and bottom surfaces thereof.

* * * * *